(12) United States Patent
Nabeiro

(10) Patent No.: US 11,000,147 B2
(45) Date of Patent: *May 11, 2021

(54) BREWING DEVICE WITH MOBILE CAPSULE SUPPORT

(71) Applicant: NOVADELTA—COMÉRCIO E INDÚSTRIA DE CAFÉS S.A., Lisbon (PT)

(72) Inventor: Rui Miguel Nabeiro, Campo Maior (PT)

(73) Assignee: NOVADELTA—COMÉRCIO E INDÚSTRIA DE CAFÉS S.A., Lisbon (PT)

(*) Notice: Subject to any disclaimer, the term of this patent is extended or adjusted under 35 U.S.C. 154(b) by 208 days.

This patent is subject to a terminal disclaimer.

(21) Appl. No.: 16/090,943

(22) PCT Filed: Apr. 7, 2017

(86) PCT No.: PCT/PT2017/050010
§ 371 (c)(1),
(2) Date: Oct. 3, 2018

(87) PCT Pub. No.: WO2017/176139
PCT Pub. Date: Oct. 12, 2017

(65) Prior Publication Data
US 2019/0117008 A1 Apr. 25, 2019

(30) Foreign Application Priority Data
Apr. 7, 2016 (PT) .......................................... 109303

(51) Int. Cl.
*A47J 31/36* (2006.01)

(52) U.S. Cl.
CPC ................................ *A47J 31/3638* (2013.01)

(58) Field of Classification Search
CPC ... A47J 31/3638; A47J 31/407; A47J 31/3633
USPC ...................................................... 99/295, 300
See application file for complete search history.

(56) References Cited

U.S. PATENT DOCUMENTS

| | | | |
|---|---|---|---|
| 3,266,410 A * | 8/1966 | Novi .................... | A47J 31/3609 99/287 |
| 3,292,527 A * | 12/1966 | Stasse .................. | B67D 1/0078 99/295 |
| 4,389,925 A * | 6/1983 | Piana .................... | A47J 31/368 99/289 R |
| 4,724,752 A * | 2/1988 | Aliesch ............... | A47J 31/3628 99/289 R |

(Continued)

*Primary Examiner* — Eric S Stapleton
(74) *Attorney, Agent, or Firm* — Sughrue Mion, PLLC

(57) ABSTRACT

The present invention discloses a brewing device (1) adapted for preparing beverages, in particular aromatic beverages such as espresso coffee and similar, by means of mixing a pressurized flow with an edible substance contained in a capsule (2). Said brewing device (1) comprises a force transmission disposition (3), an injection disposition (4), a collection disposition (5) and a structural disposition (6), as well as a base support (7) provided on the downwards-oriented side of said injection disposition (4) and projecting beyond thereof so as to provide support to a downwards-oriented part of said capsule (2), whereby said base support (7) is provided so that can be moved together with said injection disposition (4), and moved relative thereto.

19 Claims, 10 Drawing Sheets

(56) References Cited

U.S. PATENT DOCUMENTS

| | | | | |
|---|---|---|---|---|
| 4,794,853 | A * | 1/1989 | Weber | A47J 31/06 210/480 |
| 4,934,258 | A * | 6/1990 | Versini | A47J 31/3614 99/289 R |
| 5,127,318 | A * | 7/1992 | Selby, III | A47J 31/0663 99/295 |
| 5,240,722 | A * | 8/1993 | Louridas | A47J 31/005 426/112 |
| 5,392,694 | A * | 2/1995 | Muller | A47J 31/36 99/295 |
| 5,555,791 | A * | 9/1996 | McNeill | A47J 31/446 210/480 |
| 5,638,740 | A * | 6/1997 | Cai | A47J 31/0657 99/295 |
| 5,657,683 | A * | 8/1997 | Sandei | A47J 31/3609 99/287 |
| 5,697,288 | A * | 12/1997 | King | A47J 31/408 99/289 T |
| 5,755,149 | A * | 5/1998 | Blanc | A47J 31/3623 99/289 T |
| 5,776,527 | A * | 7/1998 | Blanc | A47J 31/3633 426/77 |
| 6,018,863 | A * | 2/2000 | Altrock | B23P 19/001 227/144 |
| 6,116,147 | A * | 9/2000 | Schmed | A47J 31/3614 99/287 |
| 6,129,006 | A * | 10/2000 | Schmed | A47J 31/3609 99/287 |
| 6,584,888 | B2 * | 7/2003 | Cortese | A47J 31/3633 99/289 R |
| 6,740,345 | B2 * | 5/2004 | Cai | A47J 31/14 426/112 |
| 6,779,435 | B1 * | 8/2004 | Iacobucci | A47J 31/005 392/449 |
| 7,335,387 | B2 * | 2/2008 | Hayes | A47J 31/002 426/112 |
| 7,562,618 | B2 * | 7/2009 | Jarisch | A47J 31/3633 99/289 R |
| 7,594,525 | B2 * | 9/2009 | Girard | A47J 31/407 141/351 |
| 7,703,380 | B2 * | 4/2010 | Ryser | A47J 31/407 99/295 |
| 7,828,020 | B2 * | 11/2010 | Girard | A47J 31/407 141/2 |
| 8,210,396 | B2 * | 7/2012 | Girard | A47J 31/461 222/129.1 |
| 8,240,245 | B2 * | 8/2012 | Doglioni Majer | A47J 31/3609 99/302 P |
| 8,361,527 | B2 * | 1/2013 | Winkler | A47J 31/3695 426/79 |
| 8,367,133 | B2 * | 2/2013 | Keller | A47J 31/4485 426/241 |
| 8,757,227 | B2 * | 6/2014 | Girard | A47J 31/407 141/351 |
| 8,881,958 | B2 * | 11/2014 | Hoonaard | G01F 11/029 222/129.3 |
| 9,510,705 | B2 * | 12/2016 | Rolfes | A47J 31/38 |
| 2002/0078831 | A1 * | 6/2002 | Cai | A47J 31/14 99/295 |
| 2002/0088348 | A1 * | 7/2002 | Cortese | A47J 31/3638 99/295 |
| 2003/0096038 | A1 * | 5/2003 | Cai | A47J 31/14 426/77 |
| 2005/0129809 | A1 * | 6/2005 | Cortese | A47J 31/3628 426/77 |
| 2006/0016347 | A1 * | 1/2006 | Girard | B67D 3/0032 99/295 |
| 2006/0230941 | A1 * | 10/2006 | Ryser | A47J 31/3638 99/275 |
| 2006/0280841 | A1 * | 12/2006 | Cai | B65D 85/8043 426/77 |
| 2008/0041234 | A1 * | 2/2008 | Cortese | A47J 31/3628 99/290 |
| 2008/0264267 | A1 * | 10/2008 | Doglioni Majer | B65D 85/8043 99/295 |
| 2009/0007794 | A1 * | 1/2009 | Cortese | A47J 31/3628 99/289 R |
| 2009/0035438 | A1 * | 2/2009 | Cortese | A47J 31/3628 426/590 |
| 2009/0249961 | A1 * | 10/2009 | Cheng | A47J 31/3633 99/289 R |
| 2009/0293736 | A1 * | 12/2009 | Jarisch | A47J 31/3633 99/295 |
| 2010/0034942 | A1 * | 2/2010 | Illy | A47J 31/002 426/433 |
| 2010/0092629 | A1 * | 4/2010 | Keller | B01F 5/0682 426/241 |
| 2010/0101428 | A1 * | 4/2010 | Fin | A47J 31/3638 99/295 |
| 2010/0224077 | A1 * | 9/2010 | Jing | A47J 31/3633 99/295 |
| 2011/0030562 | A1 * | 2/2011 | Ambrosini | A47J 31/0663 99/289 R |
| 2011/0162530 | A1 * | 7/2011 | Castellani | A47J 31/3638 99/279 |
| 2012/0055343 | A1 * | 3/2012 | Remo | A47J 31/3614 99/289 P |
| 2012/0060698 | A1 * | 3/2012 | Baldo | A47J 31/0668 99/295 |
| 2012/0207893 | A1 * | 8/2012 | Kruger | A47J 31/3633 426/431 |
| 2013/0092031 | A1 * | 4/2013 | Magno | A47J 31/3676 99/297 |
| 2013/0112082 | A1 * | 5/2013 | Baldo | A47J 31/60 99/290 |
| 2013/0112084 | A1 * | 5/2013 | Favero | A47J 31/3685 99/297 |
| 2013/0180410 | A1 * | 7/2013 | Jing | A47J 31/3638 99/295 |
| 2013/0220138 | A1 * | 8/2013 | Deuber | A47J 31/3633 99/289 R |
| 2013/0239820 | A1 * | 9/2013 | Baldo | A47J 31/407 99/295 |
| 2014/0130679 | A1 * | 5/2014 | Baldo | A47J 31/60 99/295 |
| 2014/0338542 | A1 * | 11/2014 | Smith | A47J 31/407 99/295 |
| 2014/0338543 | A1 * | 11/2014 | Smith | A47J 31/3633 99/295 |
| 2014/0342067 | A1 * | 11/2014 | Sullivan | A47J 31/3633 426/425 |
| 2014/0342068 | A1 * | 11/2014 | Smith | A23F 3/18 426/425 |
| 2014/0342069 | A1 * | 11/2014 | Tinkler | A47J 31/407 426/425 |
| 2014/0348994 | A1 * | 11/2014 | Deuber | A47J 31/3695 426/425 |
| 2015/0157169 | A1 * | 6/2015 | Kruger | A23F 5/262 426/232 |
| 2019/0117008 | A1 * | 4/2019 | Nabeiro | A47J 31/3638 |
| 2019/0150656 | A1 * | 5/2019 | Nabeiro | A47J 31/3638 |

\* cited by examiner

SECTION D-D

SECTION E-E

SECTION F-F

SECTION K-K

SECTION L-L

BREWING DEVICE WITH MOBILE CAPSULE SUPPORT

CROSS REFERENCE TO RELATED APPLICATIONS

This is a National Stage of International Application No. PCT/PT2017/050010 filed Apr. 7, 2017, claiming priority based on Portuguese Patent Application No. 109303 filed Apr. 7, 2016.

FIELD OF THE INVENTION

The present invention refers to the field of systems for preparation of aromatic beverages by means of brewing of a respective substance, in particular systems with brewing devices adapted for collecting a capsule inside thereof.

BACKGROUND OF THE INVENTION

The prior art presents several brewing devices adapted for preparing beverages, including aromatic beverages such as for example espresso type coffee, by means of mixing of a pressurized flow with a portion of edible substance, and usually comprised in beverage preparation machines.

In particular, there are known several solutions for solving the problem of supporting a capsule since it is introduced inside of said brewing device, in an open position, until said capsule is conducted to a respective collection disposition, for example in the form of a chamber, corresponding to a closed position of the brewing device. In general, the solutions whereby the capsule is moved in a piston-like arrangement and ejected by action of the gravity force seem to present greater construction simplicity and operation reliability.

The document EP 2520203 A1 discloses a brewing device of the type of the present invention, and that presents pair or side retention elements of the capsule, configured as a kind of jaws and operated by means of telescopic shafts so as to engage a rim part of the capsule.

The documents EP 2910155 A1 e EP 2283755 B1 disclose brewing devices that comprise a base support adapted for supporting an inferior side of the capsule introduced into the brewing device. In both cases said base supports are configured as longitudinal projections provided as a single piece with the injection disposition.

The document EP 2717748 B1 discloses a brewing device that comprises a base support whose translation movement, between a further upstream position corresponding to the brewing device open, and a further downstream position corresponding to closed, is limited by two retention elements. In particular, a first retention element is provided upstream in stationary connection with the structural chassis and a second retention element is provided downstream, in stationary connection with the capsule collection disposition. Moreover, the base support is provided as a plate with a particular configuration.

The solutions known in prior art seem to present certain constrains in terms of construction simplicity and operation reliability, in particular referring to the capsule transport means towards inside of a collection chamber and out of it, in a disposition with a piston-like general movement.

GENERAL DESCRIPTION OF THE INVENTION

The objective of the present invention is to provide a brewing device adapted for preparing beverages, in particular aromatic beverages such as for example espresso coffee, adapted for collecting a portion of edible substance, optionally provided inside of a respective capsule no interior, adapted so as to provide a reliable base support by simple means, of easy production, and associated with simple constructions, of easy assembly and reliable operation, in particular in what relates to the transport of the capsule out of the brewing chamber and ejection out of the brewing device in a disposition with a generally piston-like movement.

The aforementioned objective is attained according to the present invention by means of a system for preparing beverages according to claim 1.

A related objective is to provide simple and compact force transmission means that provide a reliable actuation of the brewing device.

Another related objective is to provide simple and reliable transport means of the capsule towards inside of a collection chamber, as well as a simple and reliable movement transmission disposition.

DESCRIPTION OF THE FIGURES

The invention shall hereinafter be explained in greater detail based upon the preferred embodiments and Figures attached.

The Figures show, in simplified schematic representations.

DETAILED DESCRIPTION OF THE INVENTION

Figure 1:
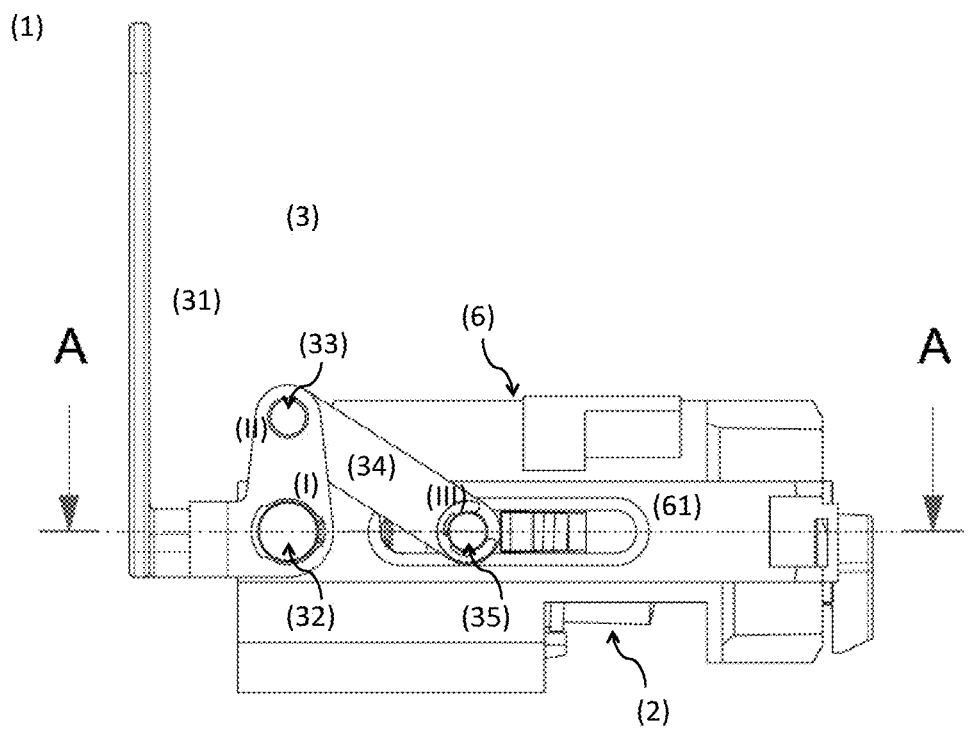
FIG. 1: side view of an embodiment of brewing device (1) according to the present invention, in an open position.

FIG. 1 schematically represents a first embodiment of a brewing device (1) according to the present invention.

Said brewing device (1) presents a force transmission disposition (3) adapted so that can convert a swivelling movement around a first rotation axis (I) into a translation movement along a longitudinal path between an upstream position, corresponding to open position of the brewing device (1), and a downstream position of the brewing device (1), and vice-versa. Said movement transmission disposition (3) comprises a first actuation element (31), associated with a stationary shaft (32) provided stationary so that can rotate around a first rotation axis (I) and with first connection elements (33) provided mobile and so that can rotate around a second rotation shaft (II), and a second actuation element (34) associated with said second rotation shaft (II), by means of said first connection elements (33), and with a third displacement axis (III), by means of second connection elements (35) provided in fixed connection with the injection disposition (4), so that said second connection elements (35) can displace along respective supports (61) provided on the side faces of the structural disposition (6), from upstream to downstream along the longitudinal direction of the brewing device (1), and vice-versa.

According to a preferred embodiment, said first actuation element (31) comprises a first part configured as a handle, a second part that provides connection to said first rotation axis (I) and a third part that provides connection to said second rotation axis (II), whereby said three parts develop along mutually orthogonal directions. Said first actuation element (31) is provided as an element in a generally "U" shape when seen sideways, comprising a first handle region, a second region of connection to said first rotation axis (I) and a third connection region to said second rotation axis (II), whereby said parts develop along orthogonal regions. This configuration of said first element (31) provides a simple and effective actuation, so that a rotation of the handle part directly drives a displacement along the longitudinal direction of said brewing device (1).

According to another preferred embodiment, said first actuation element (31) comprises a first handle region and a second and third regions provided as an element in a generally "U" shape when seen in top view and in a generally "L" shape when seen sideways.

Moreover, said stationary shaft (32) disposed on the first rotation axis (I), develops along the entire cross extension of said structural disposition (6) and is advantageously mechanically retained in only one of the sides of respective engagement with said first actuation element (31).

Figure 2:
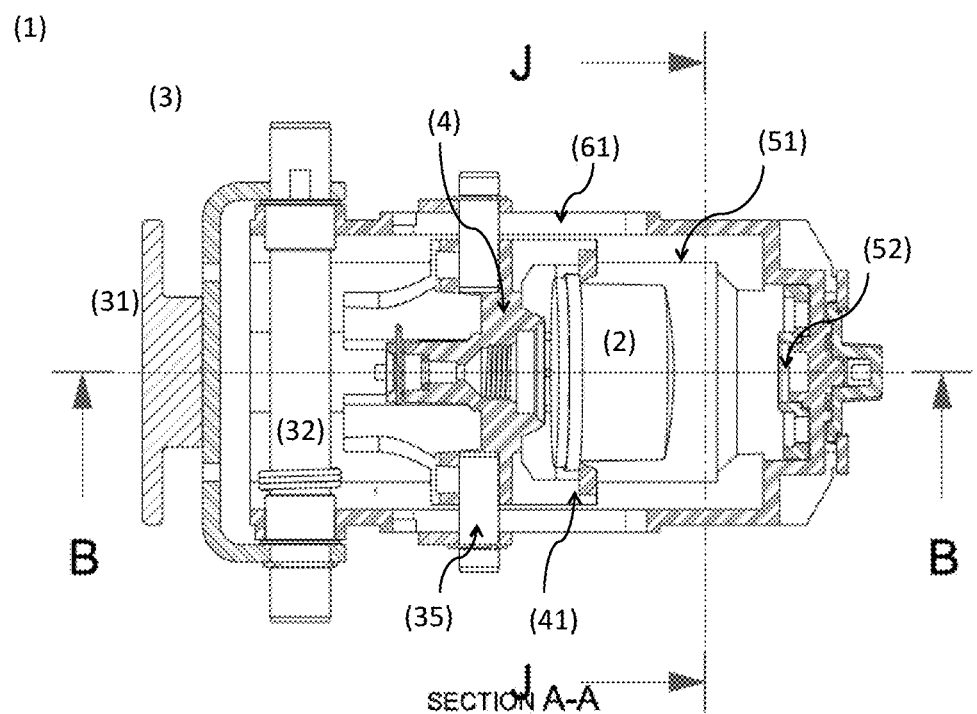
FIG. 2: view of the brewing device (1) along the A-A cut plane of FIG. 1.
Figure 3:
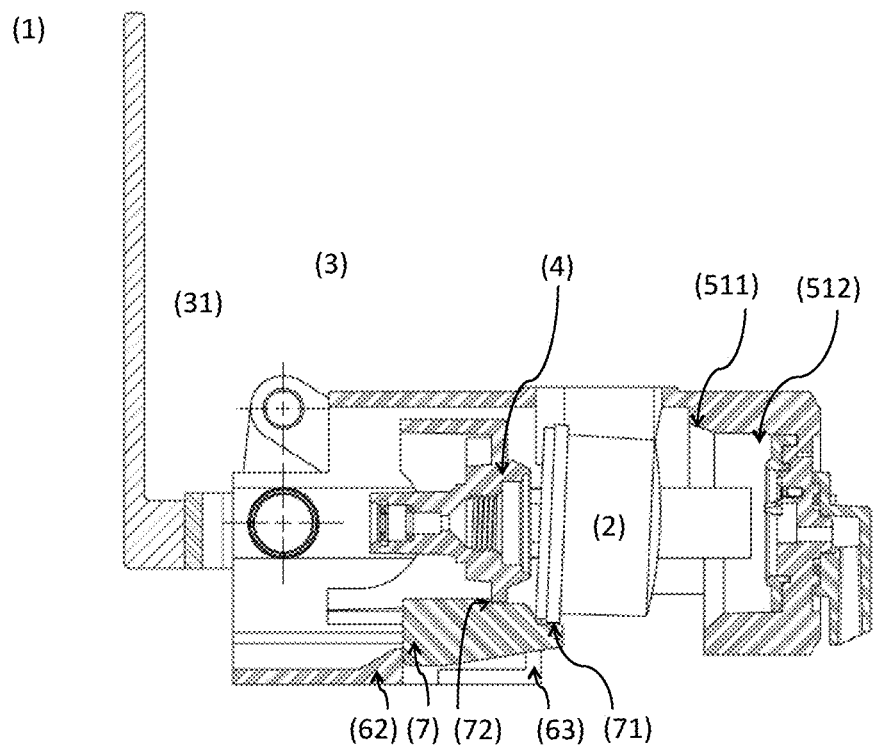
FIG. 3: view of the brewing device (1) along the B-B cut plane of FIG. 2.

As one can better observe in FIGS. 2 and 3, the brewing device (1) further comprises an injection disposition (4) provided in connection with said force transmission disposition (3) so that can be displaced in a piston manner along the longitudinal direction of the brewing device (1), between an upstream position where is further distanced and a downstream position where is adjacent to a collection disposition (5) arranged stationary at a downstream position and adapted for retention of said capsule (2), and vice-versa.

The brewing device (1) further presents a structural disposition (6) that provides support for said dispositions of force transmission (3), injection (4) and collection (5). According to another preferred embodiment, said collection (5) and structural (6) dispositions are provided as a single piece.

Moreover, as can be observed in FIG. 2, said injection disposition (4) presents capsule side supports (41) on both sides, for example provided as grooves with inside oriented openings and adapted to retain a portion of said capsule (2), for example a rim-like projection thereof. Moreover, and as can be observed in FIG. 3, said injection disposition (4) is associated to a base support (7) provided so that can be moved along an engagement part (44) provided on the downwards oriented side of said injection disposition (4).

As can be further observed in FIG. 3, said base support (7) is adapted so that, when in its furthest upstream position, corresponding to said open position, projects beyond said injection disposition (4) thereby providing support to a downwards oriented portion of said capsule (2).

According to a preferred embodiment, said base support (7) presents a first upwards oriented surface, configured for example as a projection on the top surface of said base support (7), adapted so as to provide support for said capsule (2) during part of the movement thereof heading downstream, and a second downstream oriented surface, configured for example as a projection on the top surface of said base support (7), so that said base support (7) can be pushed by the injection disposition (4) during part of the movement thereof heading upstream.

Figure 4:
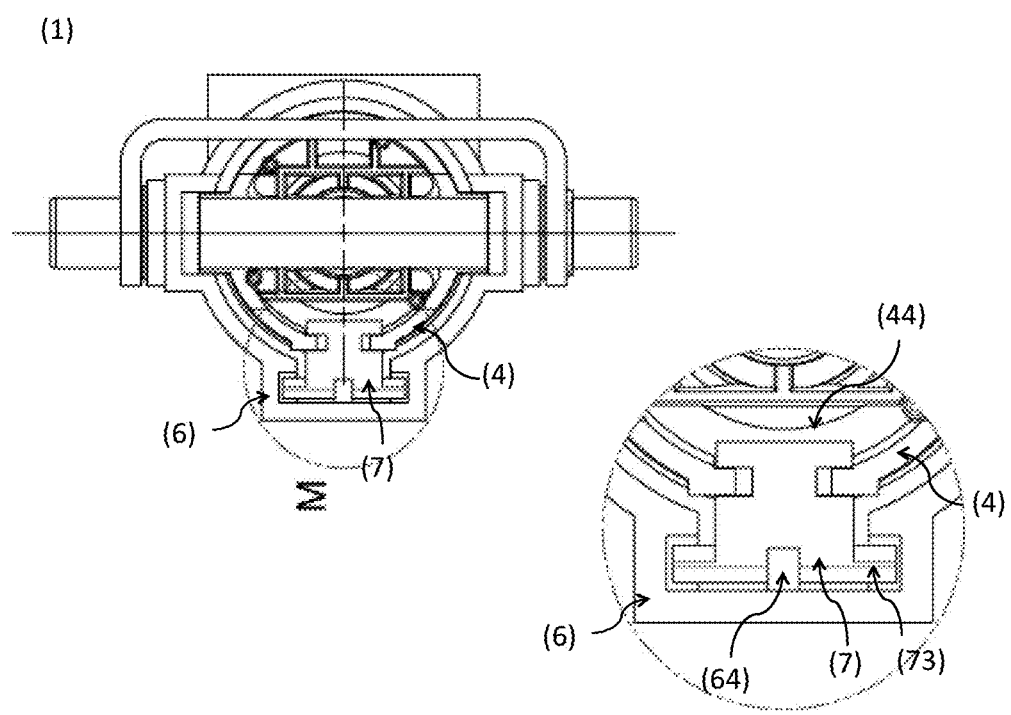
FIG. 4: posterior view of the brewing device (1) according to the present invention, including detail (on the right-hand side)

According to a preferred embodiment, and as can be better observed in FIG. 4, said base support (7) is provided so that engages in movable manner under tight pressure on a corresponding engagement element (64), configured for example as projection or cavity of a rail-like connection, and provided on the downwards oriented side of said injection disposition (4), so that said base support (7) can be pushed by the injection disposition (4) during part of the movement thereof heading downstream.

Moreover, according to another preferred embodiment, said base support (7) further presents sideways projections (72) disposed so that said base support (7) is retained by a downstream retention part (63) of said structural disposition (6), during part of the movement of said injection disposition (4) and base support (7) heading downstream.

According to a first inventive aspect, the brewing device (1) presents a base support (7) provided as a piece associated with said injection disposition (4) so that can be moved jointly with it, and relative thereto, along at least two parts of the piston-like displacement path of said injection disposition (4) between a further upstream position, corresponding to the open position, and a further downstream position, corresponding to the closed position, and vice-versa.

Figure 8:
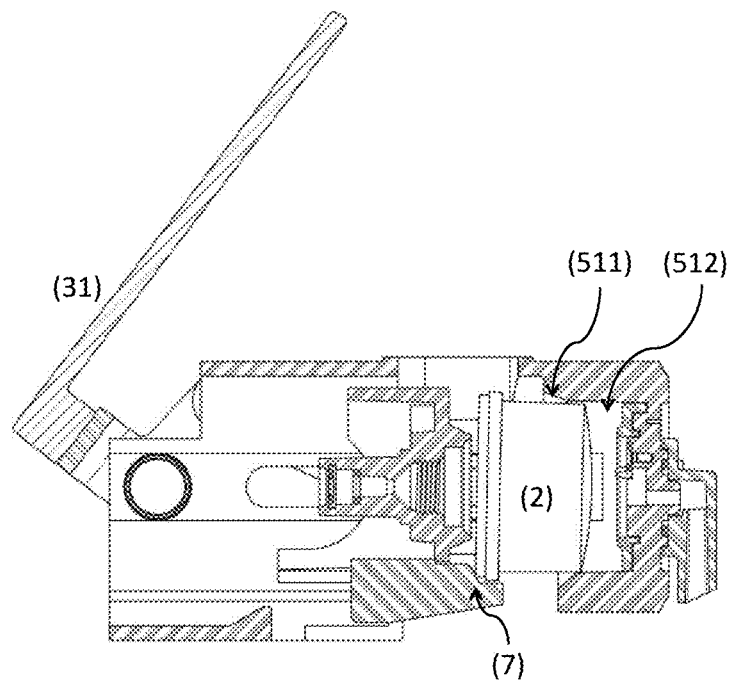
FIG. 8: view of the brewing device (1) along the D-D cut plane of FIG. 6.

In fact, as one can compare in FIGS. 3 and 8, said base support (7) is initially displaced together with said injection disposition (4), thereby providing support to the capsule (2)

up until a position where the latter is already at least partially supported inside of the collection chamber (51).

According to a preferred embodiment, in the movement heading downstream, that is in the movement providing closing of the brewing device (1), the base support (7) pulled together with said injection disposition (4) as a result of the pressure tight connection with the latter, preferentially by means of a rail-like male-female connection, or similar.

Figure 12:
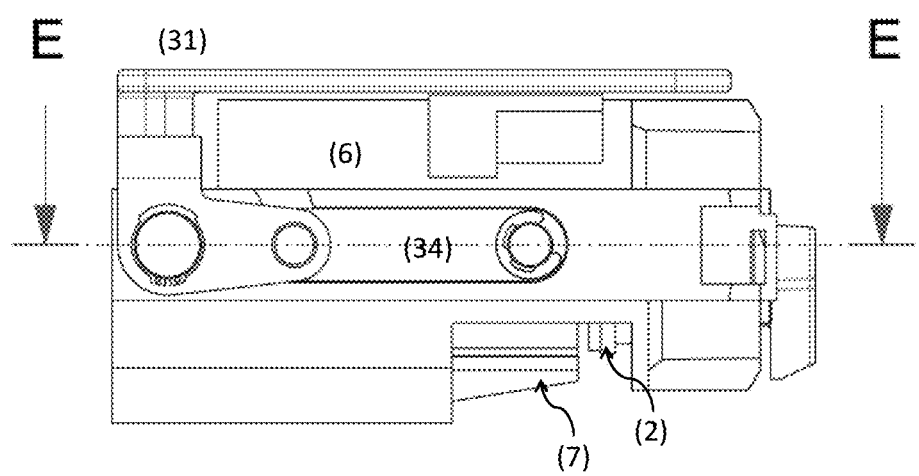
FIG. 12: side view of an embodiment of the brewing device (1) according to the present invention, in a closed position corresponding to the injection disposition (4) displaced further downstream.
Figure 14:
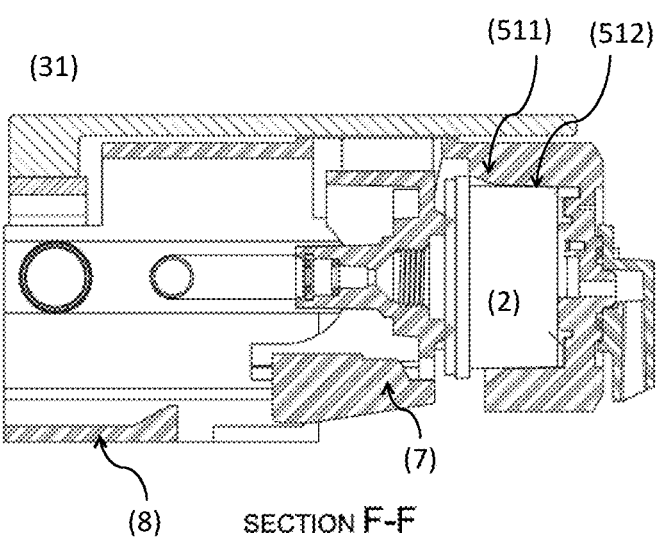
FIG. 14: view of the brewing device (1) along the F-F cut plane of FIG. 13.

With the continuation of the closing movement, as one can compare in FIGS. 8 and 14, said base support (7) is retained relative to the further forward movement of the injection disposition (4), so that when a closed position of said brewing device (1) is reached, said capsule (2) is completely introduced in the collection chamber (51) and is no longer supported by said base support (7)—see in particular FIG. 12.

Figure 9:
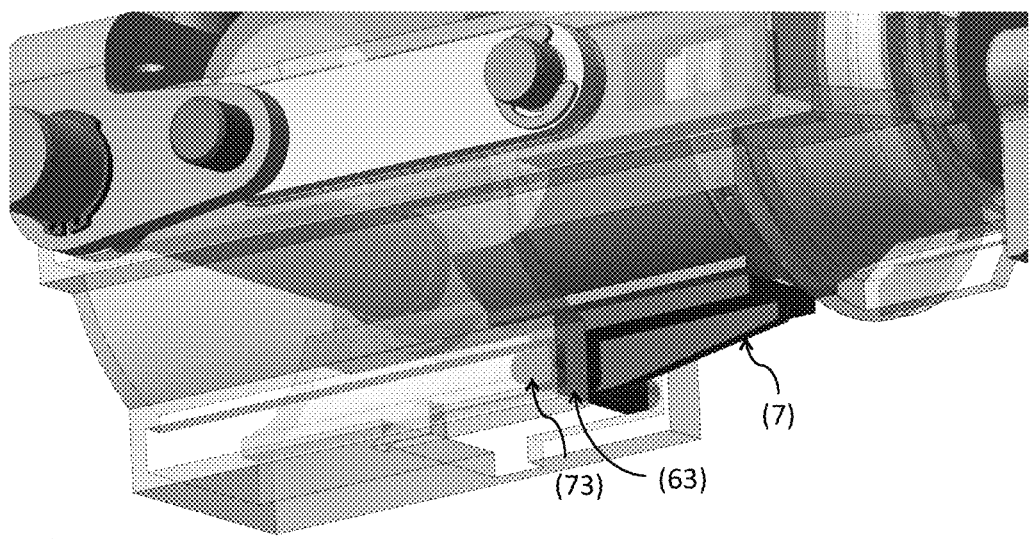
FIG. 9: perspective view from underneath of an embodiment of a brewing device (1) according to the invention.

FIG. 9 shows the retention of the base support (7) by means of the sideways projections (73) provided so that they are retained by corresponding retention parts downstream of the structural disposition (6), so that results a removal of support provided to the capsule (2) by said base support (7), during the part of the movement of said injection disposition (4) heading downstream where the capsule (2) is already supported along a sufficient extension by said collection chamber (51).

Figure 10:
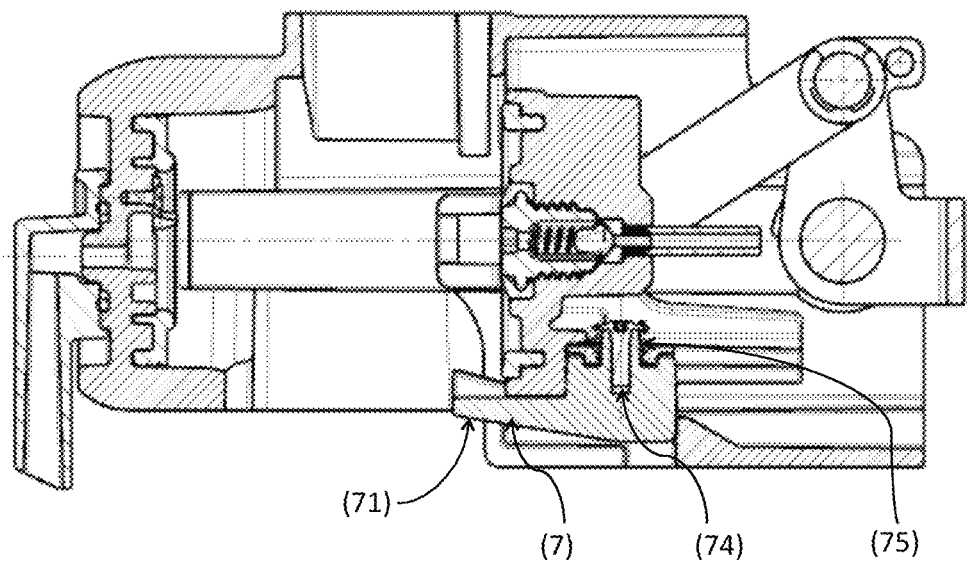
FIG. 10: longitudinal side view of an embodiment of a brewing device (1) according to the present invention, in an open position, showing the retention of the base support (7)

Moreover, according to a preferred embodiment, represented in FIG. 10, the first support surface (71) of said base support (7), presents a region of projection on the edge relative to the remanding extension, in particular a projection adapted so that can engage with a rim-like region of said capsule (2), thereby improving the retention thereof.

Figure 11:
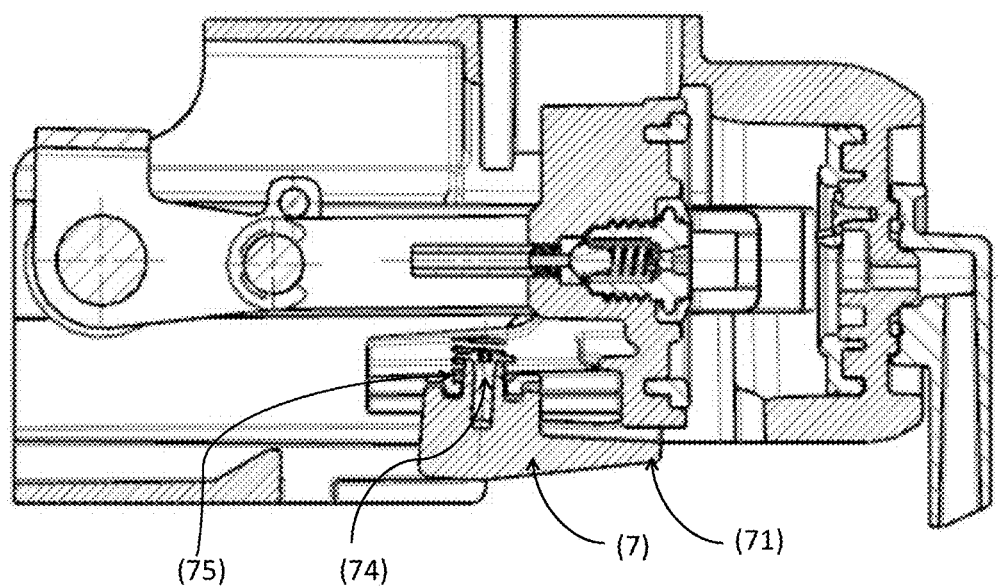
FIG. 11: longitudinal side view of an embodiment of a brewing device (1) according to the present invention, in a closed position, showing the retention of the base support (7)

Moreover, according with a preferred embodiment, said base support (7) is connected to said engagement part (44) by means of a fixation element (74) along the direction transversal to the direction of opening and closing movement of said brewing device (1), for example by means of a screw, or similar, and by an elastic element (75), for example of helicoid spring type, so that there is a reinforcement of the friction connection to said engagement part (44), while also provided a possibility of rotation movement along a vertical plane so as to accommodate the passage of said projection of first support surface (71) underneath of said injection disposition (4) when reaches a closed position, as represented in FIG. 11.

Figure 15:
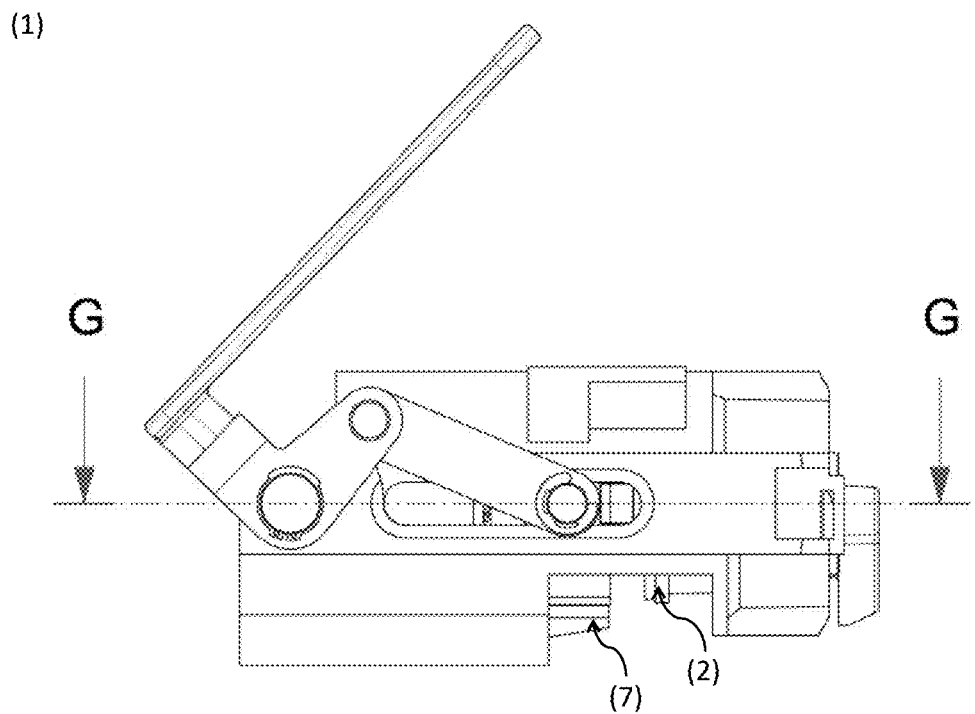
FIG. 15: side view of an embodiment of a brewing device (1) according to the present invention, in an intercalary position of the upstream return movement of the injection disposition (5)
Figure 16:
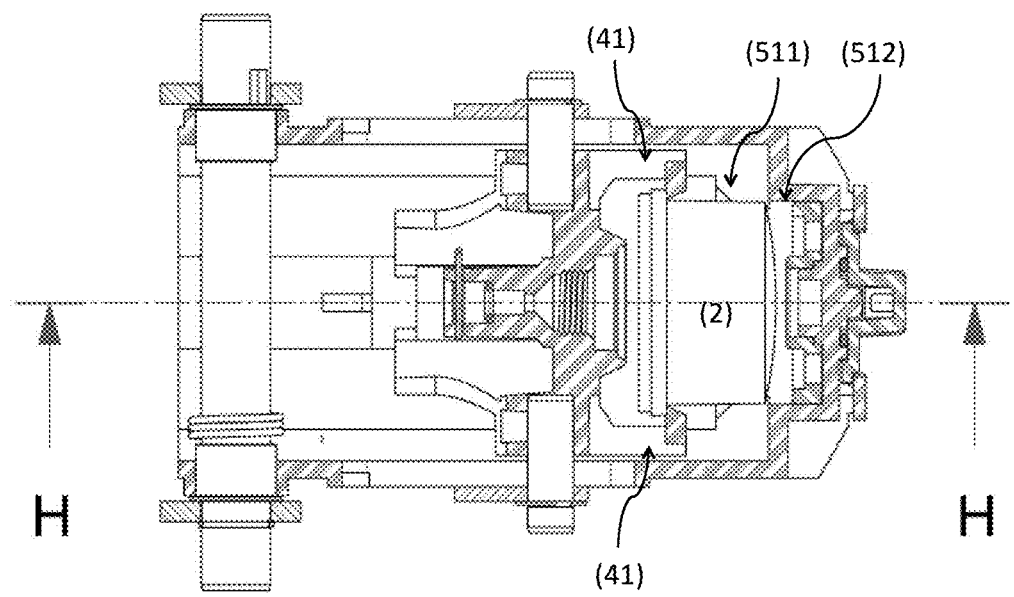
FIG. 16: view of the brewing device (1) along the G-G cut plane of FIG. 15.
Figure 17:
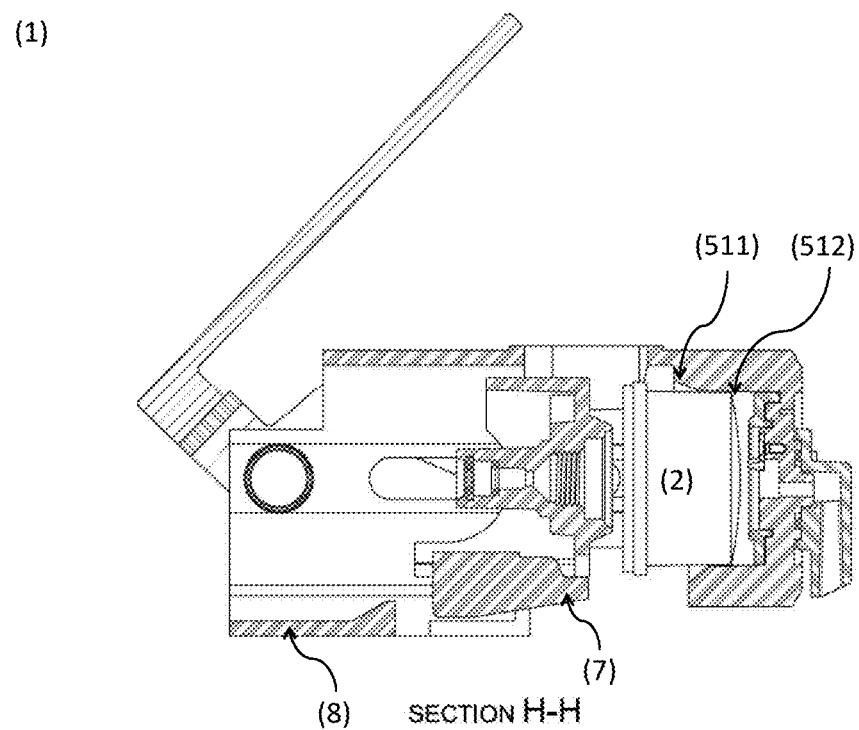
FIG. 17: view of the brewing device (1) along the H-H cut plane of FIG. 16.
Figure 18:
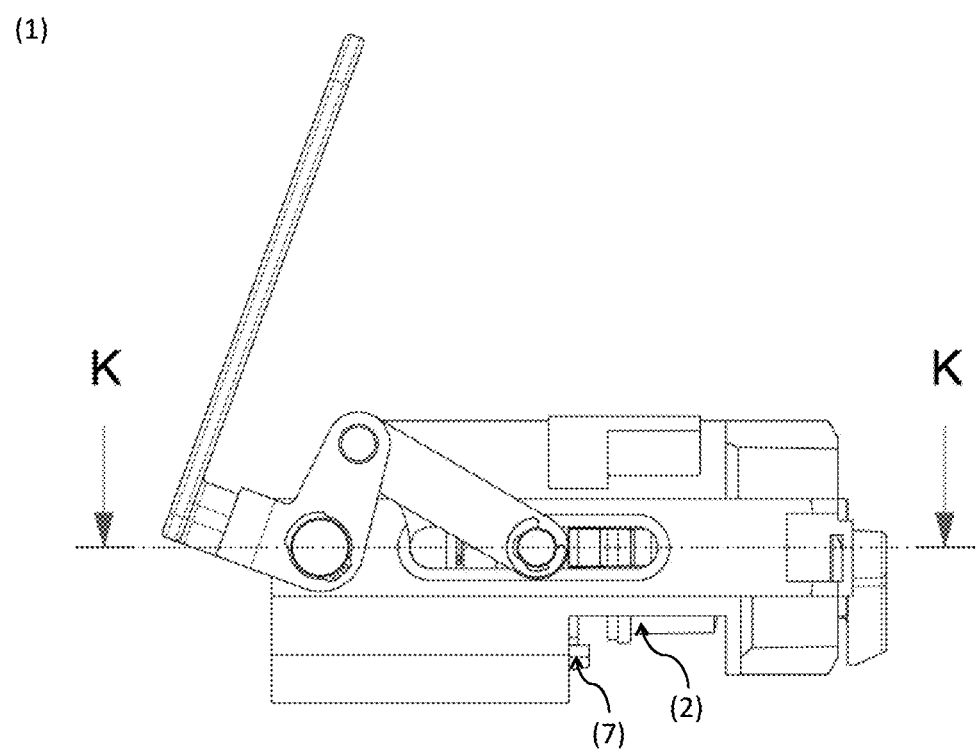
FIG. 18: side view of an embodiment of a brewing device (1) according to the present invention, again in an open position corresponding to the injection disposition (4) displaced further upstream.
Figure 19:
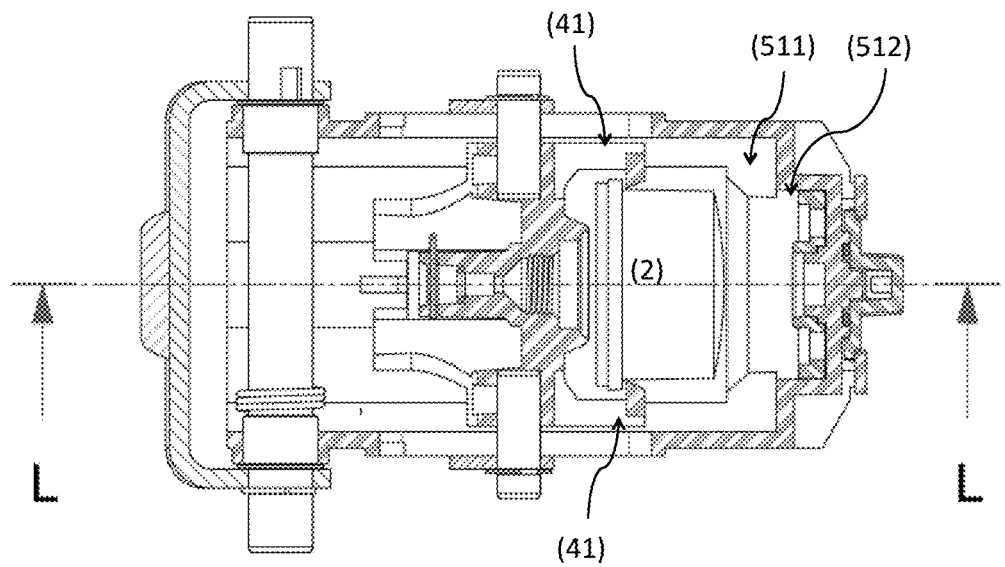
FIG. 19: view of the brewing device (1) along the K-K cut plane of FIG. 18.
Figure 20:
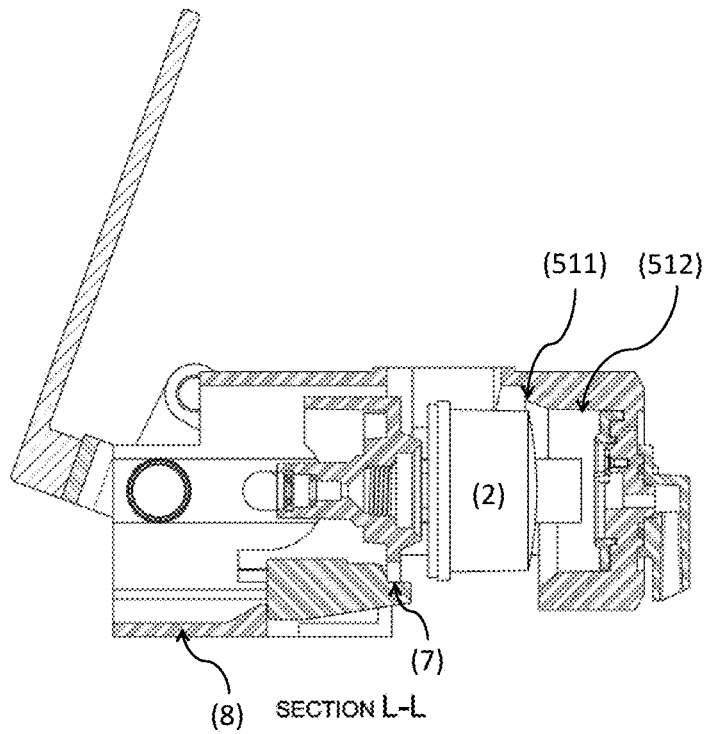
FIG. 20: view of the brewing device (1) along the L-L cut plane of FIG. 19.

During the opening movement of the brewing device (1), represented on FIGS. 15 to 20, the capsule (2) starts being pulled out of the collection chamber (51) by means of said capsule sideways supports (41)—see FIG. 16, —this time without the capsule (2) being supported by said base support (7)—see FIG. 17, —so that when reaches a position being completely removed—see FIGS. 19 and 20, —falls under the action of the gravity force.

Figure 13:
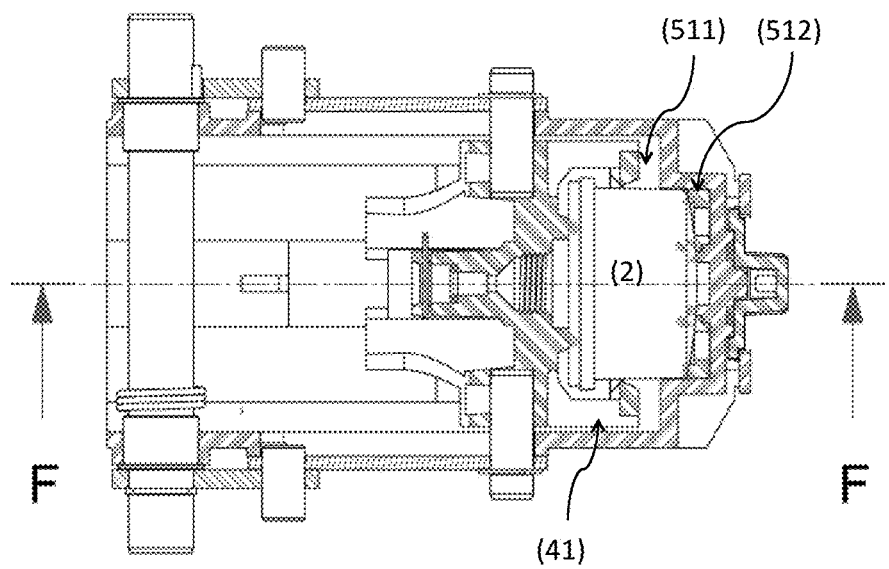
FIG. 13: view of the brewing device (1) along the E-E cut plane of FIG. 12.

According to a second inventive aspect of the present invention, said collection chamber (51) is adapted so that said capsule sideways supports (41) maintain a respective engagement with the upstream region of the capsule (2) when the latter is completely introduced into said collection chamber (51)—see in particular FIG. 13, —so that can pull said capsule (2) upstream, out of the collection chamber (51), as soon as starts an opening movement heading upstream of the brewing device (1) from a respective closed position—see in particular FIG. 15.

According to the represented preferred embodiment, said capsule sideways supports (41) and said collection chamber (51) are for this purpose adapted so that said capsule sideways supports can be moved together with the capsule (2) at least partially inside of said collection chamber (51) until the furthest downstream position of the capsule (2), thus further keeping engagement with the capsule (2) when the brewing device (1) is in the closed position. It is thereby provided a simpler and more reliable construction of means for supporting the capsule (2), and in particular removing thereof out of the collection chamber (51), without the need of some type of movement of said sideways supports (41) relative to the injection disposition (4).

According to a preferred embodiment, said collection chamber (5) presents two successive chamber sections (511, 512) that present different dimensions, whereby a first upstream chamber section (511) presents an asymmetric cross-section. In particular, said collection chamber (51) presents an asymmetric general form of circular cylindrical or frusto-conic type that presents a first upstream section (511) and a second downstream section (512), whereby the cross-sections of said upstream and downstream sections (511, 512) are different.

Figure 5:
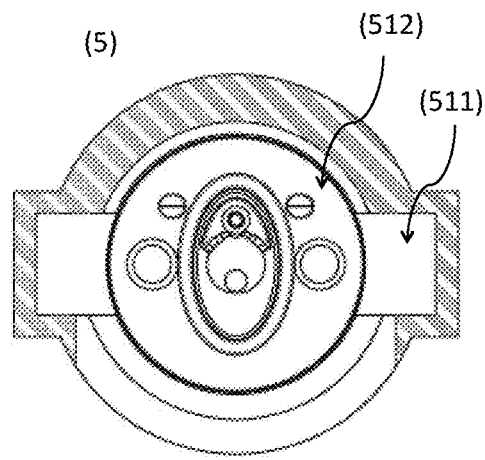
FIG. 5: view of the brewing device (1) along the J-J cut plane of FIG. 2.
Figure 6:
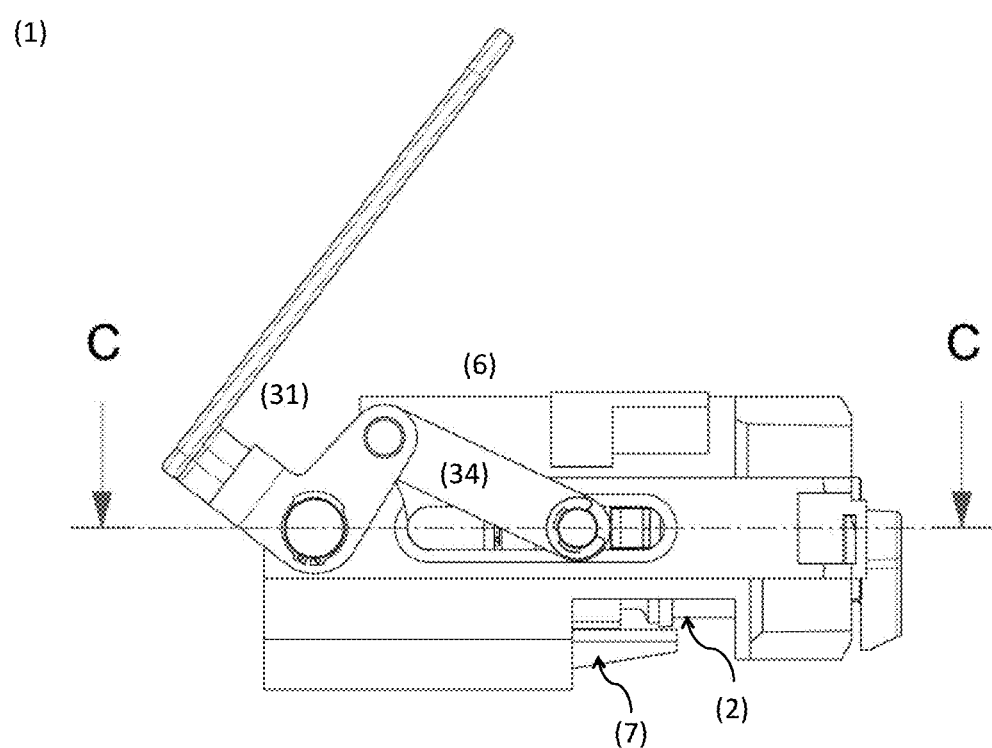
FIG. 6: side view of an embodiment of a brewing device (1) according to the present invention, at a position corresponding to the injection disposition (4) displaced to an intermediary position downstream of the open position.
Figure 7:
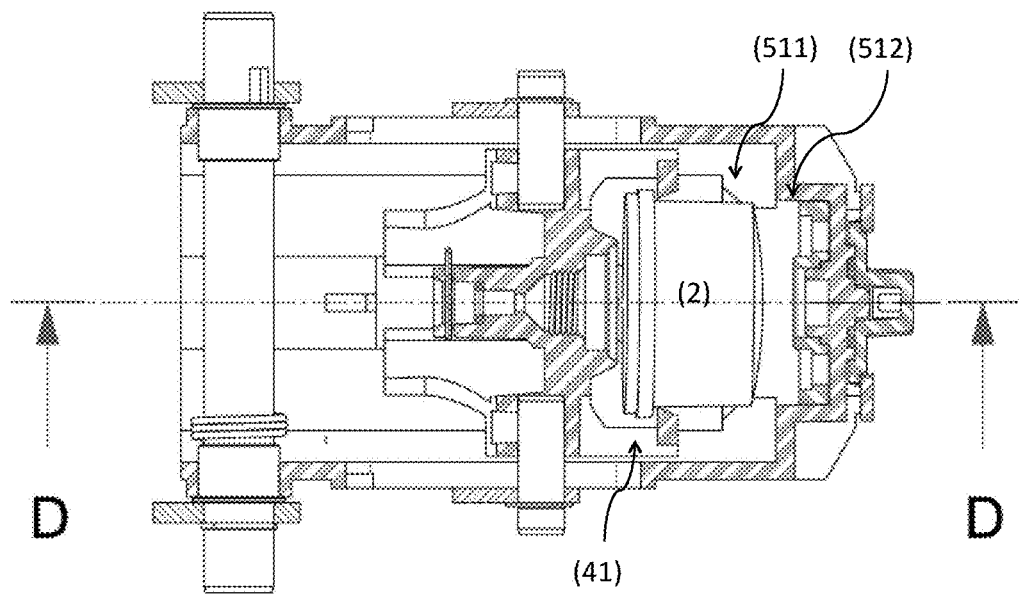
FIG. 7: view of the brewing device (1) along the C-C cut plane of FIG. 5.

According to another preferred embodiment, and as can be better observed in FIG. 5, said first upstream section chamber (511) presents a cross dimension that is bigger along a horizontal plane than along a vertical plane along a first extension upstream in the longitudinal direction, and a similar cross dimension along both planes in a second extension along the longitudinal direction, so that said capsule sideways supports (41) can be moved inside of said first upstream chamber section (511) until reaching the closed position.

According to another preferred embodiment, said first upstream chamber section (511) extends along an extension in the longitudinal direction that is at least similar as, preferentially bigger than, the extension of a second downstream chamber section (512) in said longitudinal direction. In particular, it is preferred when said second downstream chamber section (512) presents a form and dimensions so as to fit in adjacent manner with the wall of the downstream region of the capsule (2), preferentially so as to provide a substantially liquid tight fitting in the downstream region of the capsule (2).

The invention claimed is:
1. A brewing device (1) for preparing beverages by mixing a pressurized flow with an edible substance provided inside of a capsule (2), said brewing device in an operational position defining a vertical direction relative to a base thereof, a longitudinal direction along the base, and a sideward direction along the base and orthogonal to said longitudinal direction, whereby said brewing device (1) presents from upstream to downstream:
a force transmitter (3) operative to convert a swivelling movement in a first direction around a rotation axis (I), into a piston-like linear movement along a displacement course in the longitudinal direction of the brewing device (1), between an upstream position where the brewing device (1) is open, and a downstream position where the brewing device (1) is closed, and vice-versa,
an injector (4) operatively coupled to said force transmitter (3) and movable in a piston-like manner along the longitudinal direction of the brewing device (1), between the upstream open position and the downstream closed position thereof, and vice-versa,
a collector (5) arranged in a stationary manner at the downstream position and adapted for retaining said capsule (2), said collector (5) comprising a collection chamber (51) with an upstream-oriented opening, and a discharge opening (52) providing a downstream fluid connection, a structural support (6) that provides support to said force transmitter (3), whereby said injector (4) comprises side supports (41) adapted for supporting said capsule (2) and provided in the sideward direction on both sides of said injector (4), said side supports comprising grooves developing along the vertical direction and with openings extended inwardly along the sideward direction and adapted to retain a portion of said capsule (2) in the form of a rim-like projection, in a position aligned with an introduction onto said collection chamber (51), and whereby said injector (4) further comprises a base support (7) provided on a downwards-oriented side of said injector (4) and extending beyond thereof in the longitudinal direction, so as to provide support to a downwards-oriented portion of said capsule (2), wherein said base support (7) is movable together with said injector (4), and retainable relative to said injector (4), so that said base support (7) only provides support to said capsule (2) along an upstream portion of the displacement course of injector (4).

2. The brewing device (1) according to claim 1, wherein said base support (7) is movable together with said injector (4) along an upstream portion of said displacement course, so that said support does not provide support to said capsule (2) when the capsule is at least partially introduced inside of said collection chamber (51).

3. The brewing device (1) according to claim 1, wherein said base support (7) is retained, by means of a portion of said structural support (6), on a region of said piston-like course of said injector (4) that corresponds to the introduction of at least most of said capsule (2) inside of said collection chamber (51).

4. The brewing device (1) according to claim 1, wherein said base support (7) engages under pressure in tight-fit manner, in a rail-like connection, with a corresponding engagement projection or cavity (44), whereby said engagement projection or cavity (44) is provided on the downwards oriented side of said injector (4), so that said base support (7) can be moved by said injector (4) during a portion of the movement of said injector (4) heading downstream.

5. The brewing device (1) according to claim 1, wherein said base support (7) presents on its downstream edge a first support surface (71) that is upwards oriented, presenting a projection on the edge of the top surface of said base support (7), whereby said first support surface (71) is adapted so as to provide support for said capsule (2), when said capsule (2) is introduced into said brewing device (1) and during a portion of a downstream heading movement thereof.

6. The brewing device (1) according to claim 1, wherein said base support (7) presents on its top surface a downstream oriented second surface (72), configured as a cam or as a wedge, whereby said second surface (72) is adapted so that said base support (7) can be pushed by said injector (4) during a portion of the downstream heading movement of said injector (4).

7. The brewing device (1) according to claim 1, wherein said base support (7) presents sideways projections (73) arranged for retention by a downstream retention portion (63) of said structural support (6), during a portion of the movement of said injector (4) heading downstream.

8. The brewing device (1) according to claim 1, wherein said structural support (6) presents an upstream retention portion (62) adapted so as to retain the movement of said base support (7) at a further upstream position thereof, in relation to the movement of said injector (4) heading downstream from said upstream position.

9. The brewing device (1) according to claim 1, wherein said collection chamber (51) and said side supports (41) are adapted so that said side supports (41) further sideways engage said capsule (2) in the extension of said displacement course where the capsule (2) is introduced furthest downstream into said collection chamber (51), so that said side supports (41) can pull said capsule (2) upstream, out of said collection chamber (51), driven with the opening movement of the brewing device (1) from its closed position.

10. The brewing device (1) according to claim 1, wherein said collection chamber (51) and said side supports (41) are adapted so that said side supports (41) can be moved together with said capsule (2), at least until partially inside of said collection chamber (51), thereby maintaining supporting engagement with said capsule (2) in the extension of said displacement course where the brewing device (1) is in the closed position.

11. The brewing device (1) according to claim 1, wherein said collection chamber (51) presents a shape of circular cylindrical type or frusto-conical type, that presents a first upstream chamber section (511) and a second downstream chamber section (512), whereby said second downstream chamber section (512) presents a form and dimensions adapted so as to fit, with the downstream region of the side wall of said capsule (2).

12. The brewing device (1) according to claim 1, wherein said collection chamber (51) presents a first upstream chamber section (511) that presents a cross dimension that is bigger along a horizontal plane than along a vertical plane extending in a first upstream extension along the longitudinal direction, and a cross dimension that is similar along both horizontal and vertical planes extending in a second downstream extension along said longitudinal direction, so that said side supports (41) can be moved inside of said first upstream chamber section (511) until reaching said closed position.

13. The brewing device (1) according to claim 1, wherein said collection chamber (51) presents a first upstream chamber section (511) that extends along an at least similar extension along the longitudinal direction, as the extension of a second downstream chamber section (512) along said longitudinal direction, whereby said first upstream chamber section (511) presents a cross opening that comprises a first angular extension that develops along a constant diameter and a second angular extension that develops sideways along a horizontal plane and extends beyond of said constant diameter, with dimensions adapted so as to collect said side supports (41) inside of said collection chamber (51).

14. The brewing device (1) according to claim 1, wherein said side supports (41) are provided in stationary connection with said injector (4).

15. The brewing device (1) according to claim 1, wherein said force transmitter (3) comprises:
a first actuation element (31), associated with a stationary shaft (32) provided stationary so that it can rotate around a first rotation axis (I), and with first connection elements (33) provided mobile and so that it can rotate around a second rotation axis (II), and
a second actuation element (34) associated with said second rotation axis (II), by means of said first connection elements (33), and with a third displacement axis (III), by means of second connection elements (35) provided in fixed connection with said injection disposition (4), so that said second connection elements (35) can be displaced along respective supports (61) provided on the side faces of the structural support (6), from upstream heading downstream along the longitudinal direction of the brewing device (1), and vice-versa.

16. The brewing device (1) according to claim 15, wherein said first actuation element (31) comprises a first handle region and a second and third regions provided as "U"-like shaped when seen from above and "L"-like shaped when seen sideways.

17. The brewing device (1) according to claim 15, wherein said stationary shaft (32) extends along the entire cross extension of said structural support (6), is supported in both edge regions and is mechanically retained in only one side.

18. The brewing device (1) according to claim 1, wherein said force transmitter (3) comprises a first actuation element (31) that presents a first portion configured as handle, a second portion that provides connection to said rotation axis (I), and a third portion that provides connection to said second rotation axis (II), whereby said three portions develop along orthogonal directions relative to each other.

19. The brewing device (1) according to claim 1, wherein said collector (5) and structural support (6) are provided as a single piece.

\* \* \* \* \*